United States Patent [19]
French et al.

[11] Patent Number: 6,135,276
[45] Date of Patent: *Oct. 24, 2000

[54] VEHICLE CLEANING KIT

[76] Inventors: Roland C. A. French; Cyril L. A. French, both of 91-1361 30th Street S.E., Salmon Arm, British Columbia, Canada, V1E 2P2

[ * ] Notice: This patent is subject to a terminal disclaimer.

[21] Appl. No.: 09/321,575

[22] Filed: May 28, 1999

Related U.S. Application Data

[63] Continuation-in-part of application No. 09/086,254, May 28, 1998, Pat. No. 5,909,832.

[51] Int. Cl.$^7$ ...................................................... B60R 11/06
[52] U.S. Cl. ........................... 206/225; 206/229; 224/547
[58] Field of Search ...................................... 206/223, 225, 206/226, 229; 224/545, 547, 555, 567; 248/222.14

[56] References Cited

U.S. PATENT DOCUMENTS

| | | | |
|---|---|---|---|
| 2,990,944 | 7/1961 | Bombarger et al. | 206/229 |
| 4,516,676 | 5/1985 | Cournoyer | 206/229 |
| 4,887,713 | 12/1989 | Tupper | 206/229 |
| 5,035,321 | 7/1991 | Denton | 206/223 |
| 5,085,317 | 2/1992 | Jensen et al. | 206/229 |
| 5,238,106 | 8/1993 | Nguyen et al. | 206/223 |
| 5,839,771 | 11/1998 | DeMars | 206/225 |

FOREIGN PATENT DOCUMENTS

| | | |
|---|---|---|
| 07257330 | 10/1995 | Japan . |
| 2273040 | 6/1994 | United Kingdom . |

*Primary Examiner*—Jim Foster
*Attorney, Agent, or Firm*—Hall, Priddy, Myers & Vande Sande

[57] ABSTRACT

The invention relates to a vehicle cleaning kit which comprises a main housing, a housing lid dimensioned to cover the housing in sealing engagement proximate a perimeter thereof and a panel assembly dimensioned to removably retain a plurality of cleaning mechanisms. When the cleaning kit is secured to a vehicle in an upwardly arrangement, the cleaning kit provides compact, integrated mechanism for storing and accessing the cleaning mechanisms.

26 Claims, 8 Drawing Sheets

FIG. 19

VEHICLE CLEANING KIT

This application is a continuation-in-part of application Ser. No. 09/086,254 filed May 28, 1998 now U.S. Pat. No. 5,909,832.

FIELD

The present invention relates to a cleaning kit. More particularly, the present invention relates to a compact multi-purpose cleaning kit that is mountable to a vehicle.

BACKGROUND

A wide variety of cleaning materials are commonly used by vehicle owners to clean and maintain their vehicles, including, among other things, paper towels, windshield cleaning fluid, sponges, spray bottles and the like. Such cleaning materials can be particularly important for certain operations, such as in long-haul trucking operations and when travelling significant distances in rural areas. In such circumstances, vehicle operators can find their visibility reduced from the accumulation of insects and other matter on the head lights, windows and mirrors, without any service station or the like nearby. It is not unusual, for instance, for a truck driver to regularly stop in uninhabited areas and clean the accumulation of insects and the like from the headlights in order to safely maintain visibility at night. Similarly, it is often necessary to clean the front grill of a vehicle to prevent accumulated matter from blocking the free flow of air around the engine block. Typically, however, cleaning materials are stored in separate locations within a vehicle resulting in wasted space. Moreover, when such cleaning materials are separately stored they can be misplaced, placing the vehicle operator in a difficult position when it is necessary to clean the vehicle headlights, grill or the like and the necessary cleaning materials are unavailable. Even where cleaning materials are available to a vehicle operator, there is typically no platform or other organizational means for organizing the cleaning materials in an easy to access arrangement.

Accordingly, it is an object of the invention to provide an improved means for storing and managing cleaning materials in a vehicle that fulfills the above needs in the art. It is a further object of the invention to provide a simple, easy to use, compact vehicle cleaning kit. It is a further object of the invention to provide an integrated vehicle cleaning kit that can be used for a plurality of cleaning functions. It is yet another object of the invention to provide a vehicle cleaning kit that has a modular structure so as to facilitate the selective arrangement of cleaning elements within the kit.

SUMMARY OF THE INVENTION

According to the invention, there is provided a vehicle cleaning kit mountable to a vehicle surface for compact storage of, and access to, cleaning materials. The cleaning kit comprises a main housing having sidewalls and a back wall and a housing lid dimensioned to cover the housing and to fit substantially around a perimeter of the housing in sealing engagement therewith. Included with the kit there is provided a waste bin dimensioned to removably fit within the housing proximate the back wall. There is further provided a means for removably retaining a plurality of cleaning components within the housing and means for mounting the housing to a vehicle with the waste bin and cleaning components in an upright arrangement. Advantageously, the vehicle cleaning kit provides a compact, integrated mechanism for storing, accessing and using cleaning materials for use in cleaning a vehicle.

In another embodiment, there is provided a storing means being adapted to removably retain at least one of: (i) a cleaning brush with shaft; (ii) a spray bottle; and (iii) a squeegee. Preferably, when the kit is mounted to a vehicle, the storing means arranges the above cleaning components in a substantially upright and compact arrangement. The storing means, in cooperation with the side walls and back wall, forms a water tight compartment.

In another embodiment, there is provided a fluid container adapted to removably fit within the housing of the vehicle cleaning kit.

In another embodiment, the housing lid is sized to form a passageway between an inner surface of the lid and an outer surface of the housing side wall. In this embodiment, the housing lid includes means for discharging runoff fluid from the cleaning kit which would otherwise collect at the bottom of the kit when the housing lid is in sealing engagement with the housing.

In another embodiment, the fluid container includes a discharge pipe and means for closing and opening the discharge pipe so as to selectively retain fluid inside the container. This embodiment offers the advantage of improving the ability of a user to discharge fluid from the fluid container without having to remove the container from the housing.

The cleaning kit can include means for removably retaining a paper towel roll within said housing to further extend the functionality of the kit. In one preferable embodiment the paper towel roll is disposed within the housing above the waste bin with a spacing there between for access to an open end of the bin. The cleaning kit may also include a removable spring loaded paper towel holder for placing the paper towel roll into and removing it out of the housing.

Preferably, the cleaning kit is modular so as to permit easy access and maintenance of the housing and other component parts.

BRIEF DESCRIPTION OF THE DRAWINGS

The novel features believed characteristic of the invention are set forth in the appended claims. The invention itself, however, as well as other features and advantages thereof, will be best understood by reference to the detailed description which follows, read in conjunction with the accompanying drawings, wherein:

DETAILED DESCRIPTION

Figure 1:
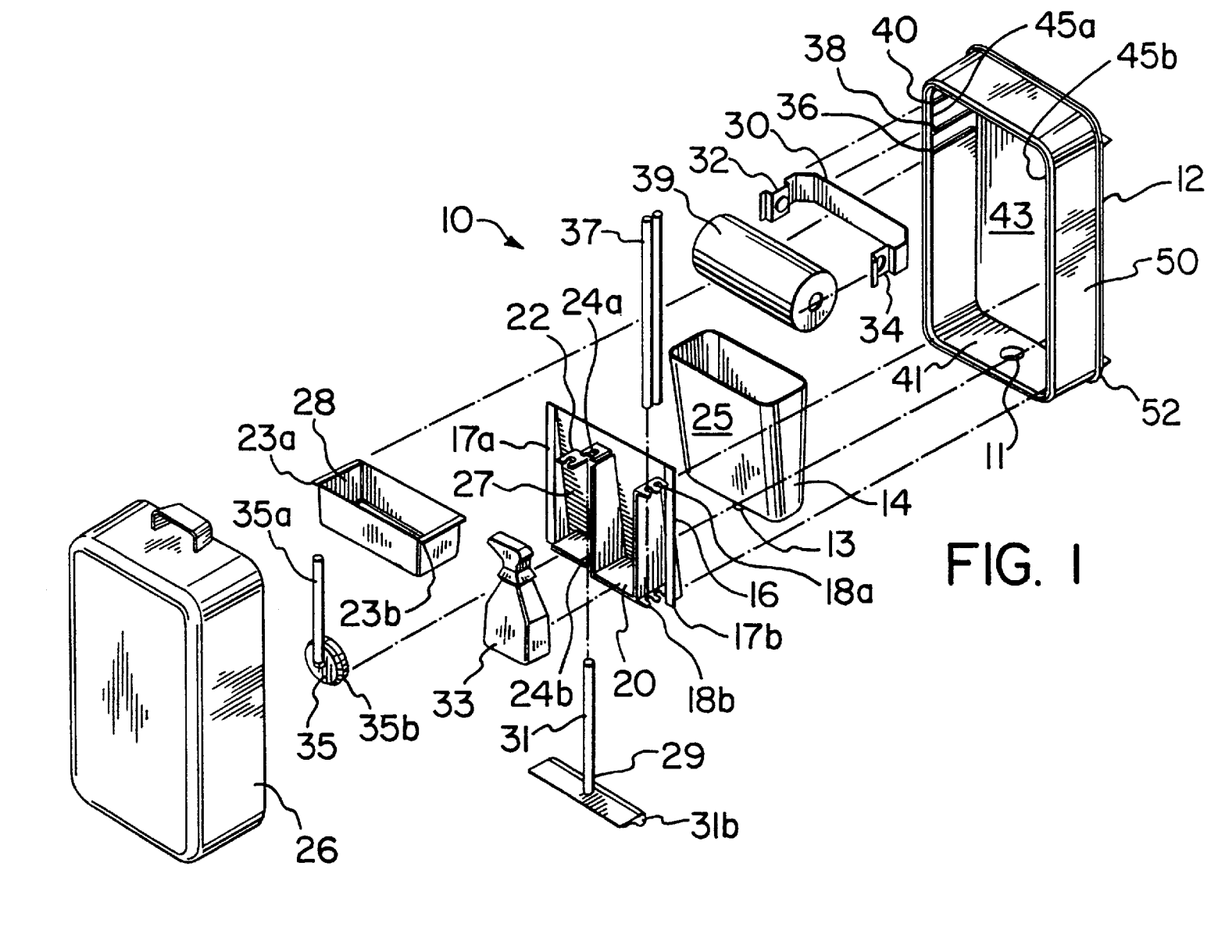
FIG. 1 is an exploded, perspective view of an embodiment of the vehicle cleaning kit.

Referring to FIG. 1, a vehicle cleaning kit 10 comprises a main housing 12 and a housing lid 26. The housing 12 is dimensioned to receive a fluid container 14, a front panel assembly 16, a paper towel holder 30 and an auxiliary bin 28, which, in combination, enable an operator to store cleaning materials such as a spray bottle 33, a brush 35, a paper towel 39, and a cleaning fluid within the fluid container 14.

Figures 2, 3:
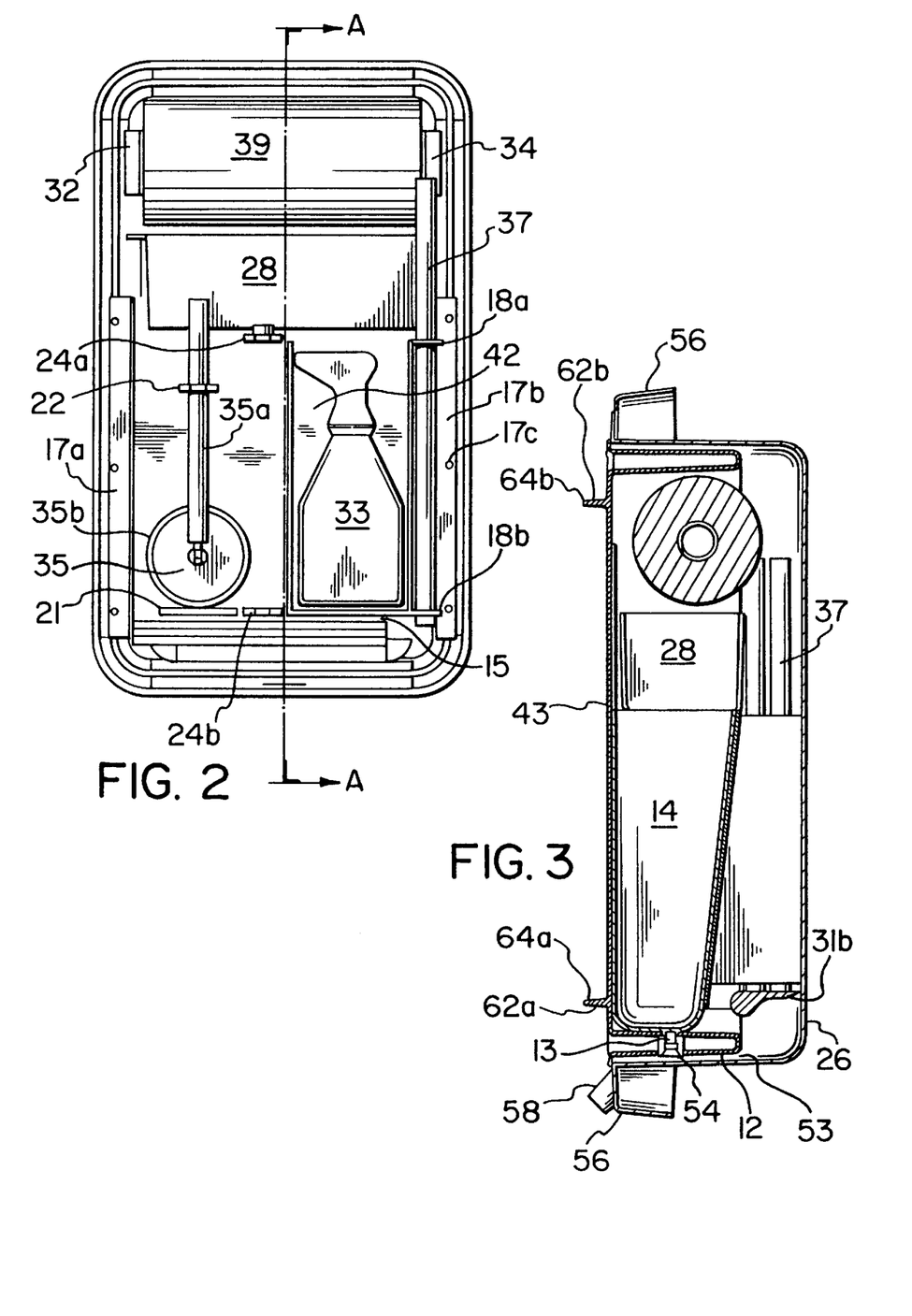
FIG. 2 is a sectional view of an embodiment of the vehicle cleaning kit.
FIG. 3 is a sectional view of the embodiment of the cleaning kit in FIG. 2 along section lines A—A.

Referring to FIGS. 1, 2 and 3, the fluid container 14 is preferably dimensioned to removably fit within the main housing 12 proximate a back wall 43 and a lower wall 41 so as to make the remaining space within the housing 12 readily available for additional elements. In one embodiment, the fluid container 14 includes a drain pipe 13 and the lower wall 41 defines an aperture 11 sized to snugly receive a drain pipe 13. The drain pipe 13 serves as a sealable opening enabling the user to drain fluid from fluid container 14 without having to remove the fluid container 14 from the housing 12. As illustrated in FIG. 3, preferably the drain plug 54 is used to close the drainage pipe 13.

Referring to FIGS. 1 and 2, a paper towel holder 30 is shown located above the fluid container 14. The paper towel holder 30 preferably comprises a substantially continuous frame including opposing releasable roller ends 32 and 34 which resiliently engage to the roller ends of a paper towel roll 39. In the embodiment illustrated in FIG. 1, the paper towel holder 30 is dimensioned to snugly, and removably, fit within the housing 12 along the guide channels 38 and 40, each of which extend substantially inwardly into the housing 12 from opposing sides 45a and 45b. Advantageously, the removable fitting of the paper towel holder 30 within the housing 12 allows for ease of mounting and removing of the paper towel roll 39 and for ease in cleaning and maintaining the vehicle cleaning kit 10. The paper towel holder 30 is preferably dimensioned so that when mounted along the guide channels 38 and 40, the paper towel holder 30 will retain a paper towel roll 39 between the roll ends 32 and 34 for subsequent use.

The front panel assembly 16 is mounted within the housing 12 in front of, and in substantially abutting arrangement with, the fluid container 14. The front panel assembly 16 includes a compartment 20 dimensioned to receive the spray bottle 33 in an upright arrangement. The retaining clips 24a and 24b extend outwardly from the front panel assembly 16 in substantially parallel alignment and are operative to removably retain the handle 31 of a window wiper/squeegee 29 such that window wiper/squeegee 29 can be readily clipped to assembly 16 in compact arrangement with the cleaning end 31b located proximate an underportion 15 of the front panel assembly 16. The front panel assembly 16 further includes a retaining clip 22 for removably retaining the brush 35 by its shaft 35a. The retaining clips 18a and 18b function to removably retain the extension shafts 37 which, in operation, can be coupled end-to-end to the shaft 35a of the brush 35 or the window wiper/squeegee 29 for improved reach and range of use when cleaning. A seat 21 extends from a lower portion of the front panel assembly 16 upon which the brush 35 can rest. Preferably, the brush 35 includes a shaft 35a and a brush pad 35b pivotally mounted to a distal end of the shaft 35a. In this compact arrangement, the brush 35 is adapted to be removably retained by retaining clip 22 with the brush pad 35b substantially parallel with the shaft 35a. Moreover, the substantially circular perimeter of brush pad 35b and the pivotal relationship of the brush pad 35b with the shaft 35a, have the advantage of improving the ability of a user to clean the rounded surfaces of headlights with the brush 35. Additionally, the front panel assembly 16 can include a clip (not shown) similar to clip 22 but sized to removably retain the neck of the spray bottle 33 so as to secure the same to the front panel assembly 16.

In the embodiment illustrated in FIGS. 1 and 3, the front panel assembly 16 includes outer flanges 17a and 17b each having a series of holes 17c. The front panel assembly 16 is shown mounted to the housing 12 with holes 17c preferably in alignment with the threaded bores 48 of the housing 12 (see FIG. 9). The front panel assembly 16 is removably coupled to the housing 12 with screws or other securing means.

Referring to FIGS. 1 and 3, where the fluid container 14 has an angular front wall 25, the front panel assembly 16 preferably includes a back panel 27 shaped to mate with the angular front wall 25 for improved use of space. In the embodiment shown in FIG. 3, the angular front wall 25 and the back panel 27 are arranged at an oblique angle of about 1 to 2 degrees measured from the lower side wall 41. Typically, the oblique angle of the angular front wall 25 and the back panel 27 will be in the range of about 1 degree to about 10 degrees, although this angle will vary with the selected application and desired spacing within the housing 12.

Referring to FIG. 1, preferably, the auxiliary bin 28 includes guide flanges 23a and 23b and can be mounted along the guide channels 36 above the front panel assembly 16 and the fluid container 14. The auxiliary bin 28 can serve to separately store additional cleaning materials or garbage and acts as a splash guard for fluid stored in the fluid container 14.

Figure 4:
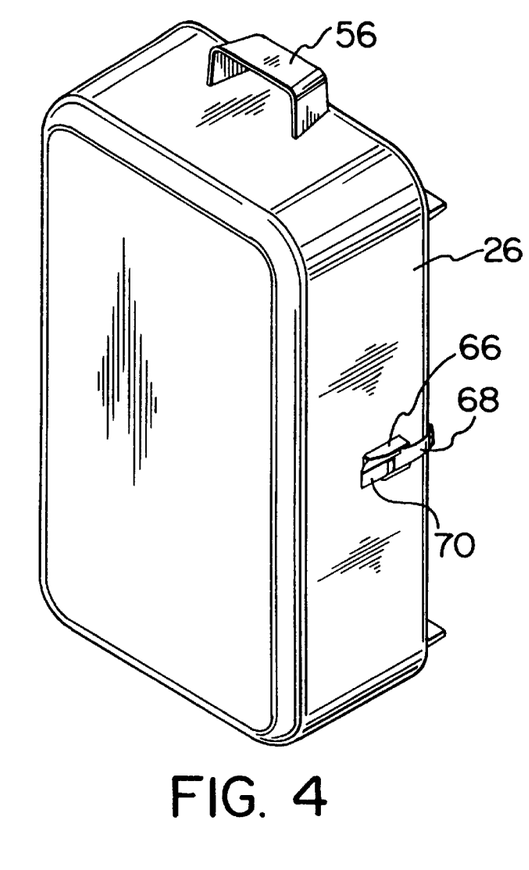
FIG. 4 is a side view of a vehicle cleaning kit lid.
Figure 5:
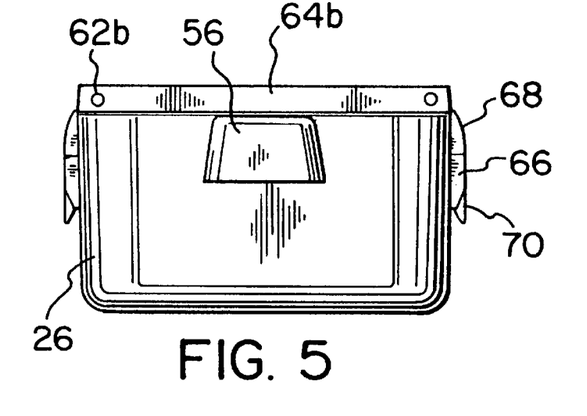
FIG. 5 is a bottom view of a vehicle cleaning kit lid.

Referring to FIGS. 1 and 3, the housing lid 26 is dimensioned to fit around substantially all of the exterior side wall 50 of the housing 12 in abutting engagement with the perimeter 52 of the housing 12. As depicted in FIGS. 4 and 5, the housing lid 26 includes a clasp 66 on opposing sides thereof to which the housing 12 can be removably secured with a strap 68 and a clip 70. Alternatively, the housing lid 26 can be secured to the housing 12 with other retaining means such as screws, clips, retaining pins, or a latch mechanism. When removed from the housing 12, the housing lid 26 can advantageously serve as a catch basin for collecting waste fluids such as oil. Additionally, the handles 56 enable a user to readily carry materials in the housing lid 26 when it is removed from the housing 12. Moreover, when the housing lid 26 is snugly mounted to the housing 12, the vehicle cleaning kit 10 can be manually carried using the handles 56. A user can carry the vehicle cleaning kit 10 manually by handles 56 or, when fluid is held in the fluid container 14, by the upper one of the handles 56 while avoiding spillage.

Figure 6:
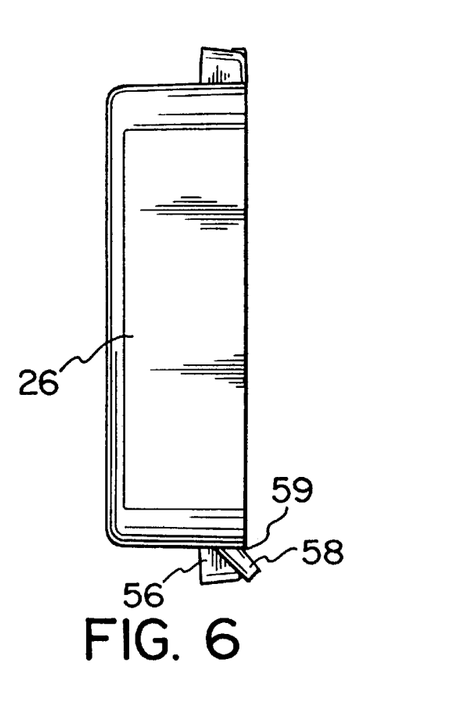
FIG. 6 is a perspective view of the vehicle cleaning kit covered by the lid and closed with a clasp.
Figure 7:
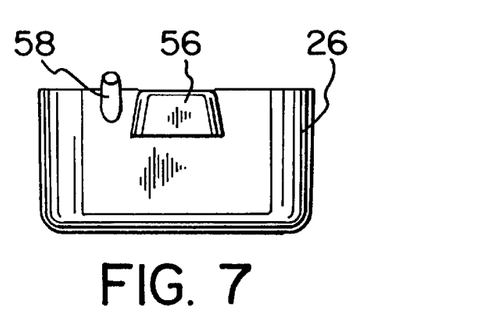
FIG. 7 is a top view of an embodiment of the vehicle cleaning kit, with the housing enclosed by the housing lid and secured thereto with retaining clasps and straps.

Referring to FIGS. 6 and 7, the housing lid 26 preferably forms a passageway 53 between an inner surface of the housing lid 26 and an outer surface of the housing 12 and includes a discharge spout 58 extending from end 59 so as to provide a means for drainage of fluids which may run into the passageway 53 off wet components inside the vehicle cleaning kit 10 after use. Advantageously, as is apparent in FIG. 3, in the event fluid inside the fluid container 14 overflows due to rough travel or a leak which may arise in the discharge pipe 58, fluid run off can also drain from the vehicle cleaning kit 10 out the discharge spout 58. In addition, the discharge spout 58 is positioned adjacent a periphery of the lower side wall 41 and directed at an inclined angle to and away from a closed wall of lid 26 enabling lid 26 to be used to collect waste fluids such as radiator fluid, engine oil or the like.

Preferably, the components of the vehicle cleaning kit 10 are made of molded plastic. Alternatively, metal components can be used where desired.

Figure 8:
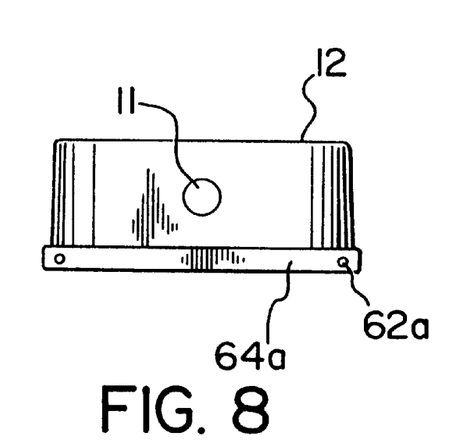
FIG. 8 is a bottom view of the main container of the vehicle cleaning kit.
Figure 9:
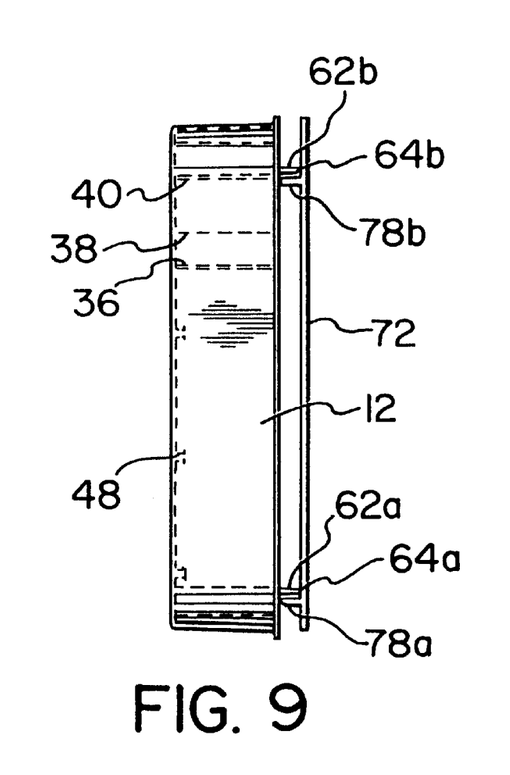
FIG. 9 is a side view of the main container of the vehicle cleaning kit.
Figure 10:
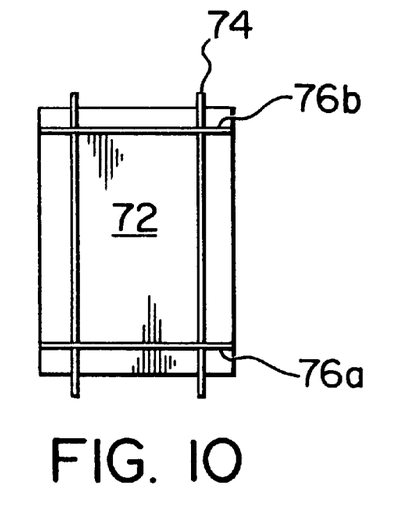
FIG. 10 is a front view of a mounting plate with mounting pins.

Referring to FIGS. 8, 9, and 10, in order to mount the vehicle cleaning kit 10 to a vehicle such as a truck, a mounting plate is preferably firmly coupled to a surface of the vehicle so as to form a substantially planar and upwardly oriented surface to which the housing 12 can be removably coupled. The housing 12 preferably includes mounting flanges 64a and 64b defining bores 62a and 62b dimensioned to receive mounting pins 74. The mounting plate 72 can include similarly shaped mounting flanges 76a and 76b having bores 78a and 78b. When the flanges 64a and 64b of the housing 12 are disposed proximate the flanges 76a and 76b with the bores 62a and 62b in alignment with the bores 78a and 78b, the mounting pins 74 can be inserted therethrough in retaining arrangement. The mounting pins 74 can then be secured in the retaining arrangement with, by way of example, securing clips or lock nuts on the threaded lower ends of the mounting pins 74. By removing only one of the pins 74, the entire installed vehicle cleaning kit 10 can be rotated to provide more favourable access if so desired.

Referring to FIGS. 1 and 2, in use, the vehicle cleaning kit 10 provides a plurality of cleaning materials in compact, ready to access arrangement. Preferably, the cleaning materials such as the window wiper/squeegee 29, the spray bottle 33, the brush 35, the extension shafts 37, and the paper towel roll 39 are arranged in the vehicle cleaning kit 10 in substantially non-interfering arrangement so as to enable easy access. Where an auxiliary bin 28 is included and sized to fit substantially between the mounted paper towel roll 39 and the fluid container 14, the brush 35 and the extension shafts 37 can be quickly detached to allow the removal or insertion of the auxiliary bin 28 into and out of the housing 12. It will also be appreciated that the paper towel holder 30 and the fluid container 14 are preferably arranged so that when the auxiliary bin 28 is removed from the housing 12, there is sufficient space for a user to access the cleaning fluid within the fluid container 14 using the window wiper/squeegee 29, the brush stick 35, a sponge, a paper towel or other cleaning materials.

Figure 11:
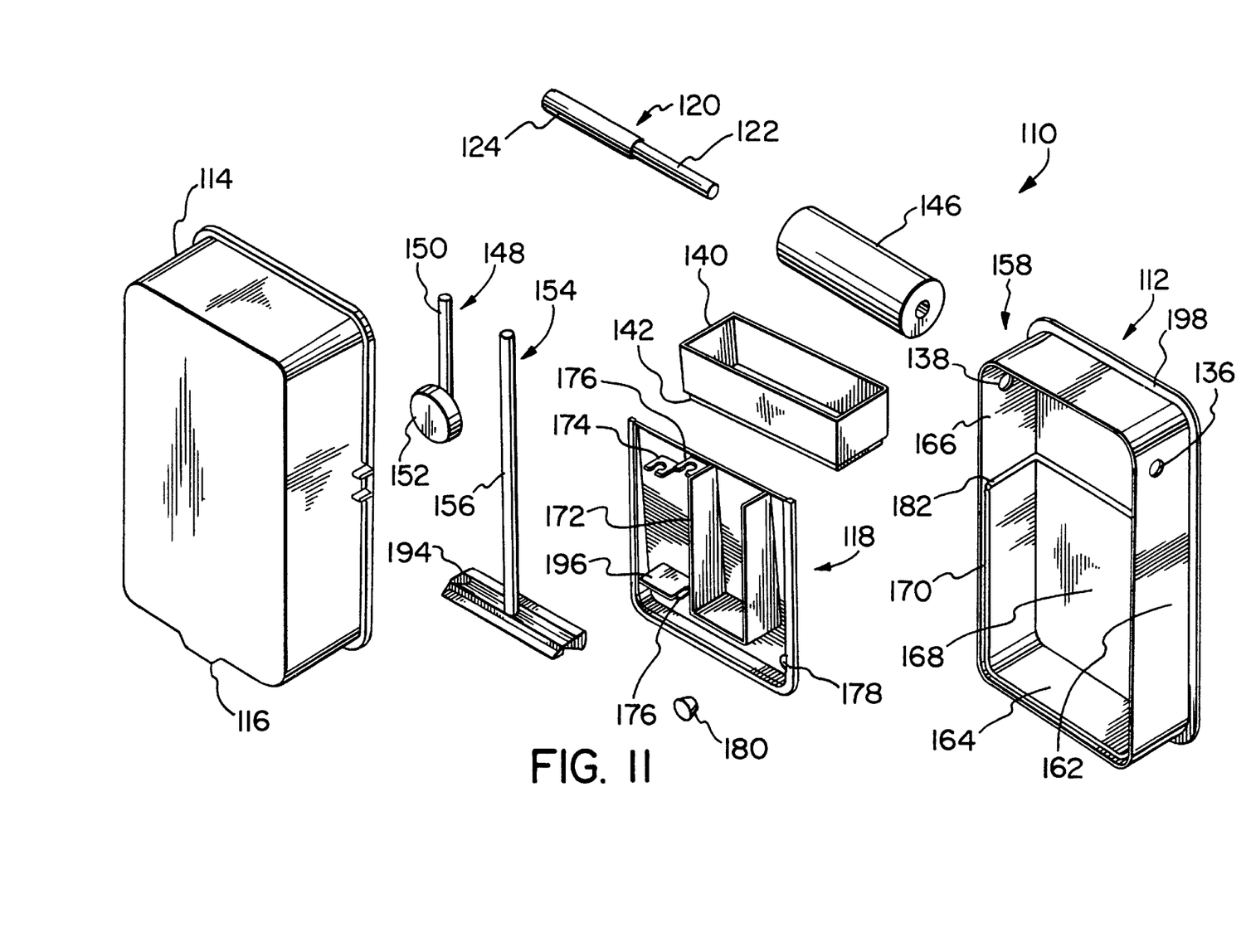
FIG. 11 is an exploded, perspective view of an alternate embodiment of the vehicle cleaning kit.
Figure 12:
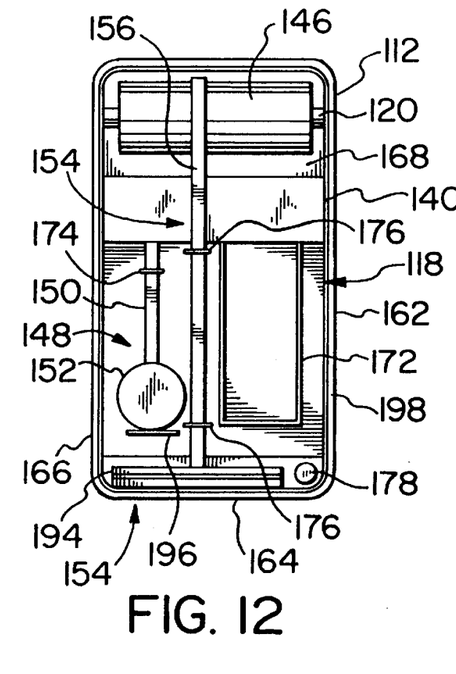
FIG. 12 is a front view of an embodiment of the vehicle cleaning kit.

Referring to FIGS. 11 and 12, an alternate embodiment of a vehicle cleaning kit 110 comprises a main housing 112 and a housing lid 114. Secured within the interior of main housing 112 is the front panel assembly 118. The front panel assembly 118 serves to removably retain a spray bottle (not shown), a brush 148, and a squeegee 154. Also, removably secured within the interior of main housing 112 are a waste bin 128 and a paper towel holder 120, which supports a roll of paper towel 146.

Figure 13:
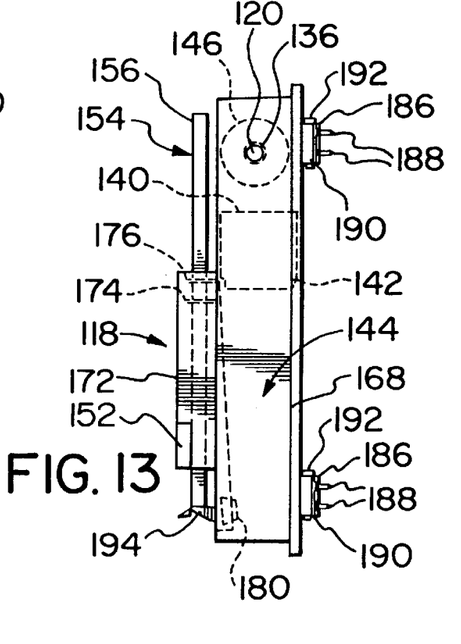
FIG. 13 is a side view of a vehicle cleaning kit.
Figure 14:
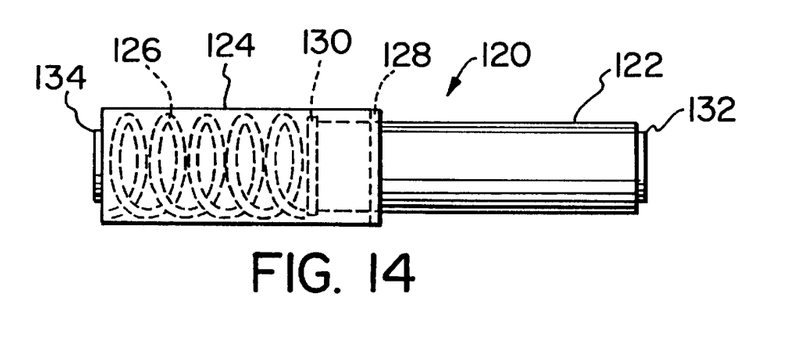
FIG. 14 is a perspective view of a paper towel holder.

Referring to FIGS. 11 and 13, the sidewalls 158 of main housing 112 have a groove 182 oriented parallel to the edges and running along the bottom 164 and a portion of the sides 162 and 166 of the interior face of sidewalls 158. Front panel assembly 118 is mounted within groove 182 of main housing 112 along the three contacting edges of front panel assembly 118. Front panel assembly 118 is held in place utilizing a liquid weld or other method of fixation such that the edges of front panel assembly 118 form a water tight seal with sidewalls 158 of the main housing 112. The water tight seal thus forms a water tight compartment 144 (see FIG. 13) between front panel assembly 118 and the back wall 168 of the main housing 112.

The front panel assembly 118 includes compartment 172 dimensioned to receive a spray bottle. Retaining clips 176 extend outwardly from front panel assembly 118 in substantially parallel alignment and are operative to removably retain handle 156 of squeegee 154 such that squeegee 129 can be readily removably retained in the front panel assembly 118 with the squeegee head 194 located proximate the bottom wall 164 of the main housing 112. Front panel assembly 118 further includes retaining clip 174 for removably retaining the shaft 150 of the brush 148. A seat 196 extends from a lower portion of front panel assembly 118 and supports the brush pad 152 of the brush 148. Additionally, front panel assembly 118 may include a clip (not shown) similar to retaining clip 174 but sized to removably retain the neck of a spray bottle so as to secure a spray bottle within compartment 172 of the front panel assembly 118. Front panel assembly 118 also includes a drain hole 178 and a drain plug 180 that can be removably secured within drain hole 178. Removal of drain plug 180 from drain hole 178 allows the liquid held in water tight compartment 144 to be drained.

A waste bin 140, having a recessed shoulder 142 extending around its bottom edge, engages mating support shoulder 182 on an interior surface of main housing 118 and the top peripheral surface of front panel assembly 118. A seal extends around the recessed shoulder 142 of waste bin 140 to prevent any liquid from escaping water tight compartment 144. Waste bin 140 serves to store garbage or alternatively, additional cleaning supplies.

Referring to FIGS. 11 to 14, paper towel holder 120 is shown located above waste bin 140. Paper towel holder 120 preferably comprises two cylindrical tubes 122 and 124, respectively, each having one end closed. Cylindrical tubes 122 and 124 operate in cooperation such that one end of cylindrical tube 122 is slidably secured within one end of cylindrical tube 124 to form a telescoping cylinder. A spring 126 within cylindrical tube 124 is arranged with one end of spring 126 abutting the closed end of cylindrical tube 124 and the other end of spring 126 abutting retaining ring 130 of cylindrical tube 122 to provide an expansive force on cylindrical tube 122 so as to fully telescope paper towel holder 120. Cylindrical tube 122 is slidably secured within cylindrical tube 124 through the interaction of retaining collar 128 and retaining ring 130 of cylindrical tubes 124 and 122, respectively. The closed ends of cylindrical tubes 122 and 124 have a diameter less than the body of cylindrical tubes 122 and 124 forming disks 132 and 134, respectively. The diameter of disks 132 and 134 are approximately equal to apertures 136 and 138 to allow disks 132 and 134 to be snugly fitted within apertures 136 and 138.

Figure 15:
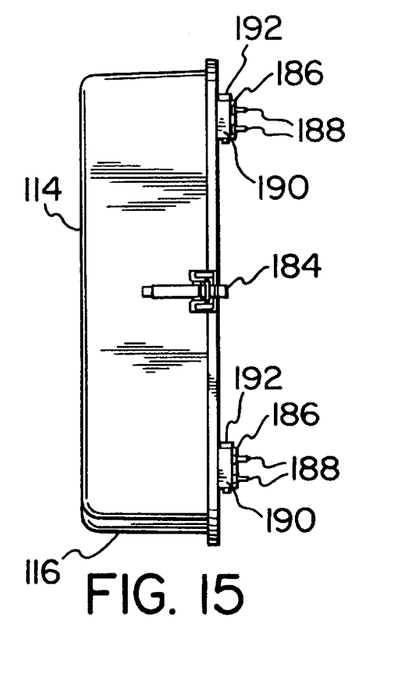
FIG. 15 is a side view of a vehicle cleaning kit.

Referring to FIGS. 11 and 15 housing lid 114 is dimensioned to fit over sidewalls 158 of the main housing 112 in abutting engagement with the perimeter flange 198 of the main housing 112. As shown in FIG. 15, housing lid 114 includes lid clasps 184 on opposing sides thereof to removably secure the housing lid 114 to the main housing 112.

Alternatively, the housing lid 114 may be secured to the main housing 112 with other securement means such as clips, retaining pins, or a latch mechanism. When removed from the main housing 112, housing lid 114 can serve as a catch basin for collecting waste fluids such as oil.

Figure 16:
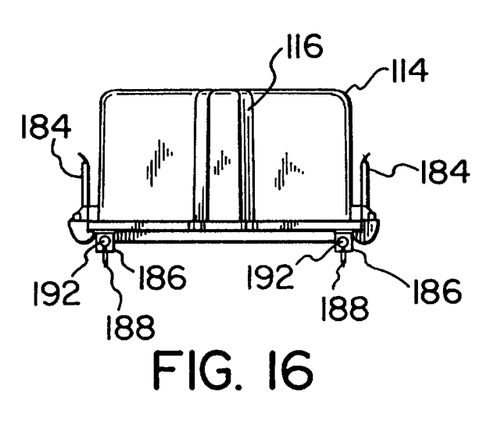
FIG. 16 is a bottom view of a vehicle cleaning kit.
Figure 17:
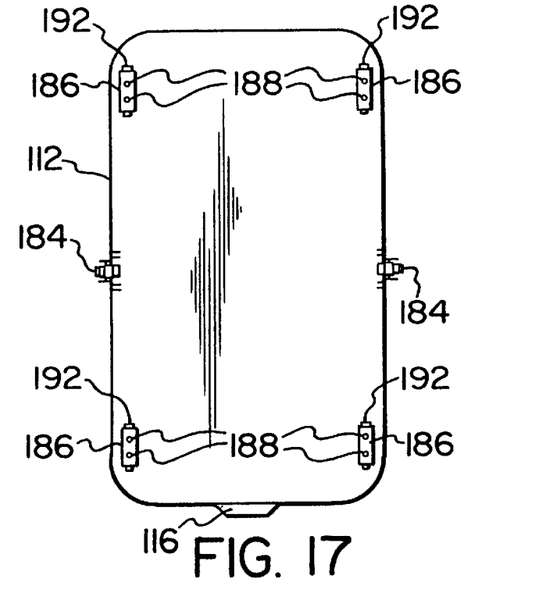
FIG. 17 is a rear view of an embodiment of the vehicle cleaning kit.

Referring to FIGS. 16 and 17, housing lid 114 also includes a trough 116 that extends perpendicularly from the edge of housing lid 114. Trough 116 serves to collect and continuously drain any liquid escaping from the water tight compartment 151, a spray bottle or other source of liquid within housing 112, The liquid collected in trough 116 is channeled towards the back wall 168 and down below the bottom wall 164 and the perimeter flange 198 where the liquid can exit the assembled vehicle cleaning kit 110.

Preferably, the components of the vehicle cleaning kit 110 are made of molded plastic. Alternatively, metal components may be used where desired.

Figure 18:
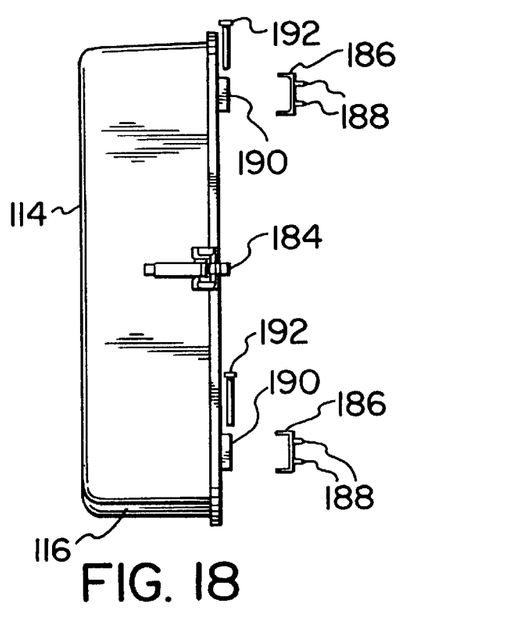
FIG. 18 is an exploded side view of a vehicle cleaning kit in accordance with the present invention showing the details of the mounting means.
Figure 19:
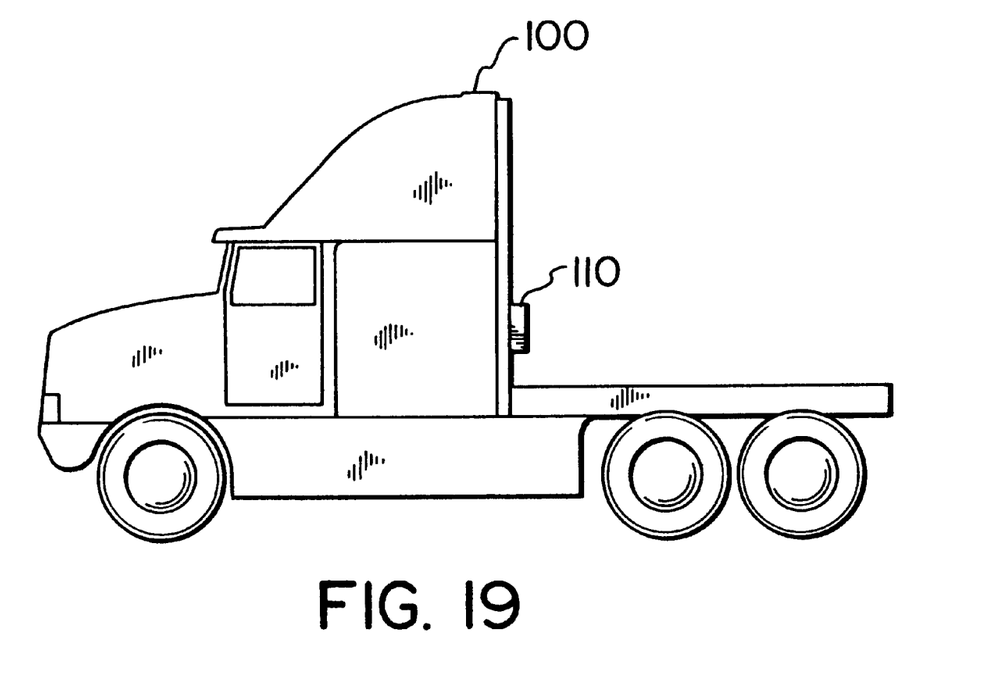
FIG. 19 is a perspective view of a truck with a vehicle cleaning kit mounted.

Referring to FIG. 19, the vehicle cleaning kit 110 is mounted on a rear cab panel of a truck 100 but may be mounted to any exterior, substantially vertically planar surface of a truck or trailer assembly. Referring to FIGS. 15, 17, and 18, the rear face of the main housing 112 includes mounting flanges 190 having a bore parallel to the sides of the main housing 112 and dimensioned to receive mounting pins 192. Mounting brackets 186 are mounted to the vehicle using screws 188. Mounting brackets 186 may also be mounted to the vehicle using double-sided adhesive tape or other securement means sufficient to support the vehicle cleaning kit 110. The mounting brackets 186 are dimensioned to receive mounting flanges 190 and include bores in the top and bottom portions dimensioned to receive mounting pins 192. When the mounting flanges 190 are received by mounting brackets 186, mounting pins 192 are inserted thereby securing the vehicle cleaning kit 110 to a vehicle. By removing two of the mounting pins 192 on the same side, the vehicle cleaning kit 110 may be rotated to provide more favourable access if so desired.

Referring again to FIGS. 11, 12 and 13, in use cleaning kit 110 provides a plurality of cleaning materials in compact, ready to access arrangement. Preferably, the cleaning materials such as squeegee 154, brush 148 and paper towel roll 146 are arranged in kit 110 in a substantially non-interfering arrangement so as to provide easy access to one without removal or displacement of another. Where waste bin 140 is included and sized to fit substantially between mounted paper towel roll 146 and brush 148, waste bin 140 can be quickly removed from, or inserted into main housing 112.

It will further be appreciated that the modular structure of cleaning kits 10 and 110 advantageously enables a user to selectively arrange cleaning materials within the kits 10 and 110. For instance, paper towel holders 30 and 120 can be removed to provide additional space for other cleaning materials, or can be replaced with an auxiliary assembly (not shown) similar to waste bins 28 and 140 for separate storage means.

Although this invention has been described with reference to illustrative embodiments, this description is not intended to be construed in a limiting sense. Various modifications of the illustrative embodiments, as well as other embodiments of the invention, will be apparent to persons skilled in the art upon reference to this description. It is therefore contemplated that the appended claims will cover any such modifications and embodiments as fall within the true scope of the invention.

What is claimed:

1. A vehicle cleaning kit comprising:
    (a) a housing having sidewalls and a back wall;
    (b) a front panel assembly within said housing and engaged with a portion of said sidewalls of said housing defining a water storage compartment within said housing;
    (c) storing means on said front panel assembly for storing a plurality of cleaning implements;
    (d) a housing lid removably engageable with said housing; and
    (e) means for mounting said housing to a vehicle with said compartment in an upright orientation.

2. A vehicle cleaning kit according to claim 1, wherein said vehicle cleaning kit includes a fluid container dimensioned to removably fit within and removably engage with said housing proximate said back wall.

3. A vehicle cleaning kit according to claim 2, wherein said housing lid includes means for discharging fluid from said vehicle cleaning kit when said housing lid is coupled to said housing and said vehicle cleaning kit is installed on said vehicle.

4. A vehicle cleaning kit according to claim 2, wherein said housing lid includes a discharger oriented to allow said housing lid to further collect and retain waste fluid when said housing lid is removed from said vehicle cleaning kit and lying with its closed end against a substantially horizontal surface so as to permit controlled emptying of the housing lid through the discharger after collecting the waste fluid.

5. A vehicle cleaning kit according to claim 2, wherein said fluid container includes:
    (a) an open end and a closed end, said closed end including a discharge opening; and
    (b) means for closing and opening said discharge opening so as to selectively drain and retain fluid inside said fluid container.

6. A vehicle cleaning kit according to claim 2, including a storage bin located above the open end of said fluid container, said storage bin acting as a splash guard for the fluid container.

7. A vehicle cleaning kit according to claim 2, wherein said storing means includes a retaining element for removably retaining at least one cleaning implement selected from the group consisting of: (i) a cleaning brush with a shaft; (ii) a spray bottle; and (iii) a squeegee; and
    wherein said retaining element retains said at least one cleaning implement in a substantially upwardly and compact arrangement when said cleaning kit is mounted to the vehicle.

8. A vehicle cleaning kit according to claim 7, wherein said storing means includes means for removably retaining a paper towel roll within said housing.

9. A vehicle cleaning kit according to claim 2, wherein said storing means includes means for removably retaining a paper towel roll within said housing.

10. A vehicle cleaning kit according to claim 9, wherein said storing means includes an assembly operative to removably retain a cleaning brush with shaft, a spray bottle and a squeegee in a substantially upwardly and compact arrangement when said cleaning kit is coupled to the vehicle.

11. A vehicle cleaning kit according to claim 9, wherein said means for removably retaining a paper towel roll within said housing includes a removable paper towel holder having a frame dimensioned to fit within said housing and to retain a paper towel roll.

12. A vehicle cleaning kit according to claim 11, including guide channel means for guiding said removable paper towel holder into said housing in a predetermined arrangement.

13. A vehicle cleaning kit according to claim 2, including a brush comprising a shaft and a brush pad, said brush pad pivotally mounted to a distal end of the shaft, said brush being adapted to be removably retained by said storing means in a retaining position; wherein said brush pad is substantially parallel with the shaft in said retaining position.

14. A vehicle cleaning kit according to claim 2, wherein said mounting means includes:
   (a) a plurality of mounting pins;
   (b) a plurality of housing flanges extending outwardly from the back wall of said housing and each defining a plurality of first bores dimensioned to receive said mounting pins;
   (c) a mounting plate couplable to a vehicle surface and having a plurality of mounting flanges each defining a plurality of second bores dimensioned to receive said mounting pins and being adapted so as to substantially align with said first bores in a predetermined arrangement; and
   (d) means for securing said mounting pins to said mounting flanges and said housing flanges when said first and second bores are in substantial alignment.

15. A vehicle cleaning kit according to claim 1, wherein said front panel assembly is secured into said housing in sealing engagement with a portion of said sidewalls of said housing defining a water tight compartment within said housing.

16. A vehicle cleaning kit according to claim 15, including a waste bin having a bottom which fits over said water tight compartment.

17. A vehicle cleaning kit according to claim 15, wherein said storing means removably retains at least one cleaning implement selected from the group consisting of: (i) a cleaning brush with a shaft; (ii) a spray bottle; and (iii) a squeegee; and
   wherein said storing means retains said at least one cleaning implement in a substantially upright orientation when said vehicle cleaning kit is mounted to said vehicle.

18. A vehicle cleaning kit according to claim 15, wherein said storing means includes a means for removably retaining a paper towel roll within said housing.

19. A vehicle cleaning kit according to claim 15, wherein said storing means includes an assembly operative to removably retain a cleaning brush with shaft, a spray bottle and a squeegee in a substantially vertical orientation and in a compact arrangement when said vehicle cleaning kit is mounted to said vehicle.

20. A vehicle cleaning kit according to claim 18, wherein said means for removably retaining said paper towel roll within said housing includes a removable paper towel holder having a cylindrical tube dimensioned to fit within said housing and to retain said paper towel roll.

21. A vehicle cleaning kit according to claim 20, wherein said cylindrical tube comprises two telescoping parts within which is located a spring which provides a means for securing said removable paper towel holder into said housing in a predetermined arrangement.

22. A vehicle cleaning kit according to claim 15, including a brush comprising a shaft and a brush pad, said brush pad pivotally mounted to a distal end of said shaft, and said storing means being adapted to removably retain said brush in a retaining position wherein said brush pad is substantially parallel with the shaft in said retaining position.

23. A vehicle cleaning kit according to claim 15, wherein said mounting means includes:
   (a) a plurality of mounting pins;
   (b) a plurality of mounting flanges extending outwardly from the back wall of said housing and each having a bore dimensioned to receive one of said mounting pins; and
   (c) a plurality of mounting brackets couplable to a vehicle mounting surface and dimensioned to receive said mounting pins and said mounting flanges and being adapted so as to substantially align with said each bore in a predetermined arrangement.

24. A vehicle cleaning kit comprising:
   (a) a housing having a substantially endless sidewall, a back wall and upper and lower ends;
   (b) a fluid container dimensioned to removably fit within said housing proximate said back wall, said fluid container having an open end, a closed end and a drain pipe proximate said closed end;
   (c) a panel assembly removably coupled to said housing and being adapted to removably retain at least one of the group consisting of: (i) a cleaning brush with a shaft; (ii) a spray bottle; and (iii) a squeegee;
   (d) a housing lid dimensioned to cover said housing and to substantially fit around a perimeter of said housing in abutting engagement therewith; and
   (e) means for mounting said housing to a vehicle with said fluid container in said upwardly arrangement.

25. A vehicle cleaning kit comprising:
   (a) a housing having, a back wall with top, bottom, and side walls around the periphery and oriented perpendicular to said back wall;
   (b) an auxiliary bin dimensioned to removably fit within said housing, said auxiliary bin having four sides and a bottom arranged to form an open top end and a closed bottom end;
   (c) a front panel assembly secured into said housing in sealing engagement with said side walls and said bottom wall forming a water tight compartment and said front panel assembly being adapted to releasably retain at least one of the group consisting of: (i) a cleaning brush with a shaft; (ii) a spray bottle; and (iii) a squeegee; and
   (d) means for mounting said housing to a vehicle with said water tight compartment in a water containing orientation.

26. A vehicle cleaning kit, comprising:
   (a) a housing having sidewalls and a back wall;
   (b) a front panel assembly engaging an interior surface of said sidewalls, said front panel assembly and said housing sidewalls and back wall forming a water container receptacle;
   (c) storing means on said front panel assembly for storing a plurality of cleaning implements;
   (d) a housing lid removably engageable with said housing; and
   (e) means for mounting said housing to a vehicle, said housing oriented so as to retain water in said water storage container.

* * * * *